US012628014B2

(12) United States Patent
Kasagi et al.

(10) Patent No.: US 12,628,014 B2
(45) Date of Patent: May 12, 2026

(54) MEASUREMENT DEVICE AND MEASUREMENT METHOD

(71) Applicant: ANRITSU CORPORATION, Atsugi (JP)

(72) Inventors: Takahiro Kasagi, Atsugi (JP); Koichi Inoue, Atsugi (JP); Hiroyuki Tanikage, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 510 days.

(21) Appl. No.: 18/163,933

(22) Filed: Feb. 3, 2023

(65) Prior Publication Data

US 2023/0319610 A1    Oct. 5, 2023

(30) Foreign Application Priority Data

Mar. 31, 2022    (JP) ................................ 2022-059000

(51) Int. Cl.
*H04W 24/08*        (2009.01)
*H04W 80/04*        (2009.01)

(52) U.S. Cl.
CPC ........... *H04W 24/08* (2013.01); *H04W 80/04* (2013.01)

(58) Field of Classification Search
CPC ...... H04W 92/16; H04W 24/08; H04W 80/04
See application file for complete search history.

(56) References Cited

U.S. PATENT DOCUMENTS

| | | | | |
|---|---|---|---|---|
| 2014/0092750 A1* | 4/2014 | Aoki | ..................... | H04W 24/00 |
| | | | | 370/241 |
| 2016/0044520 A1* | 2/2016 | Iyer | ....................... | H04W 24/08 |
| | | | | 370/252 |
| 2018/0343574 A1* | 11/2018 | Basedahl | .............. | H04W 24/06 |
| 2023/0046743 A1* | 2/2023 | Vaez-Ghaemi | .... | H04B 10/0799 |
| 2024/0306017 A1* | 9/2024 | Hishi | ................... | H04W 24/04 |

FOREIGN PATENT DOCUMENTS

JP            2021168444 A      10/2021

* cited by examiner

*Primary Examiner* — Wesley L Kim
*Assistant Examiner* — Erkin Abdullaev
(74) *Attorney, Agent, or Firm* — Greer Burns & Crain Ltd.

(57)            ABSTRACT

A measurement device includes: a display unit that displays information related to a test; a device control unit group that includes a plurality of device control units controlling control target devices of a control target device group, respectively, the control target device group including the control target devices that each simulate the component of the component group, respectively; a measurement target setting unit that sets a component selected from the component group as a measurement target device; a test case creation unit that creates a test case by displaying a use order of device control units to be used for the test of the measurement target device among the device control unit group on the display unit in a user-settable manner; and a test case execution unit that executes the test case as to the device control units to be used for the test in the set use order.

7 Claims, 6 Drawing Sheets

MEASUREMENT DEVICE AND MEASUREMENT METHOD

CROSS-REFERENCE TO RELATED APPLICATIONS

This application claims Convention priority to Japanese Patent Application No. 2022-059000, filed Mar. 31, 2022, the entire contents of which are incorporated herein by reference.

FIELD OF THE INVENTION

The present invention relates to a measurement device and a measurement method, and in particular to a measurement device and a measurement method for testing a component that constitutes O-RAN, or Open RAN in the broad sense.

BACKGROUND ART

Radio Unit (RU), Distributed Unit (DU), and Central Unit (CU), which constitute Radio Access Network (RAN) of 5th Generation Mobile Communication System (5G), have different communication interfaces between the equipment depending on the vendors, and it is difficult to constitute RAN by combining the equipment from different vendors. To solve this problem, Open Radio Access Network (O-RAN) has recently been proposed as an open radio access network with standardized specifications for communication interfaces between the equipment, based on the Open RAN concept of allowing RAN to be used by separating and combining its components.

Each vendor supporting O-RAN is required to develop equipment that complies with the O-RAN specifications established by the O-RAN Alliance and to execute interoperability test with the equipment provided by different vendors. Therefore, telecommunication carriers are required to test networks constituted by a combination of those equipment.

With respect to 5G RAN, a measurement device capable of creating a test case for testing a mobile communication terminal has been disclosed (see, for example, Patent Document 1). The test case specifies various conditions for executing a test, including test execution conditions, test procedures, inputs and expected outputs.

CITATION LIST

Patent Literature

[Patent Document 1] JP-A-2021-168444

SUMMARY OF THE INVENTION

Technical Problem

Conventional measurement device as described in Patent Document 1, is used to test a mobile communication terminal connected to a base station that constitutes 5G RAN as a test target (a device under test) and is intended to measure only the radio section with a base station simulator. On the other hand, if the O-RAN Radio Unit (O-RU) is the test target, for example, it is necessary to simultaneously control a signal analyzer and signal generator for measuring the radio section and an O-RAN Distributed Unit (O-DU) emulator for measuring the wired section. Accordingly, when a component constituting O-RAN is used as a test target, there is a problem that the conventional measurement device is not able to systematically control a control target device such as an emulator and measurement equipment with a single software or system to execute the test efficiently.

An object of the present invention is to provide a measurement device and a measurement method that can systematically and efficiently execute a test by freely selecting a component constituting the Open RAN such as O-RAN as a test target.

Means for Solving the Problem

In order to solve the above problems, a measurement device according to the present invention is a measurement device (1) for testing a component included in a component group constituting an Open Radio Access Network (Open RAN), the measurement device including: a display unit (12) that displays information related to a test; a device control unit group (14) that includes a plurality of device control units (141-147) controlling control target devices (201-207) of a control target device group (20), respectively, the control target device group (20) including the control target devices (201-207) that each simulate the component of the component group; a measurement target setting unit (151) that sets a component selected from the component group as a measurement target device; a test case creation unit (15) that creates a test case by displaying a use order of device control units to be used for the test of the measurement target device among the device control unit group on the display unit (12) in a user-settable manner; and a test case execution unit (132) that executes the test case as to the device control units to be used for the test in the set use order.

As described above, in the measurement device according to the present invention, the measurement target setting unit sets, as the measurement target device, the component selected arbitrarily from the Open RAN component group that constitutes the Open RAN. Accordingly, it is possible to freely select the measurement target from the component group that constitutes the Open RAN and execute the test. Further, the control target device group comprehensively includes, as the control target devices, at least a plurality of emulators that each simulate the component of the component group constituting the Open RAN, and the device control unit group comprehensively includes a plurality of device control units that each control the control target devices among the control target device group. The test case creation unit displays the use order of the device control units to be used for the test of the measurement target device among the device control unit group on the display unit in a user-selectable manner to efficiently create the test case. With this configuration, it is possible to execute the test systematically and efficiently on the component that constitutes the Open RAN.

Further, the measurement device according to the present invention may include a control target selection unit (152) that displays identification information of control target devices usable for the test of the measurement target device among the control target device group on the display unit in a user-selectable manner.

With this configuration, the measurement device according to the present invention displays only the control target devices usable for the test of the measurement target device among the control target device group on the display unit in a user-selectable manner, and thus it is possible to select the control target device efficiently.

Further, in the measurement device according to the present invention, the control target selection unit may select an emulator of a component adjacent to at least the measurement target device in the Open RAN as the control target device.

With this configuration, the measurement device according to the present invention does not require the user to select the emulator of the component adjacent to the measurement target device, thus it is possible to select the control target device efficiently and accurately in accordance with the measurement target device set by the measurement target setting unit.

Further, the measurement device according to the present invention may include a processing component extraction unit (153) that extracts, from a processing component database (163), identification information of control processing executable for the control target device selected by the control target selection unit as a processing component, and displays the extracted processing component in a user-selectable manner, wherein the processing component selected by the user may be associated with a device control unit in which the user order is specified in the test case.

With this configuration, since the measurement device according to the present invention can efficiently create the test case by allowing the user to select the processing component associated with the device control unit, it is possible to efficiently execute the test on the component that constitutes the Open RAN.

Further, the measurement device according to the present invention may include a processing component arrangement unit (154) that displays processing components selected from processing components extracted by the processing component extraction unit side by side on the display unit in a manner that the user can change an order of the displayed processing components, and store, in a memory unit, information on a series of the processing components arranged in the order as the test case.

With this configuration, the measurement device according to the present invention can efficiently create the test case by the user arranging the processing components side by side as desired, so that it is possible to efficiently execute the test on the component that constitutes the Open RAN.

Further, the measurement device according to the present invention may include a processing component detailed setting unit (155) that displays, on the display unit in a user-settable manner, a processing content of the processing component displayed on the display unit by the processing component arrangement unit.

With this configuration, since the measurement device according to the present invention can precisely create the test case by allowing the user to set the processing content of the processing component in detail, it is possible to accurately execute the test on the component that constitutes the Open RAN.

Further, in the measurement device according to the present invention, the component device group may include a radio unit of the Open RAN (O-RU), a distributed unit of the Open RAN (O-DU), a central unit of the Open RAN (O-CU), and a user equipment (UE).

With this configuration, in case that the Open RAN such as O-RAN includes a base station, the measurement device according to the present invention can systematically and efficiently execute the test by freely selecting a component constituting the Open RAN as a test target.

Further, in the measurement device according to the present invention, the device control unit group may include one or a plurality of device control units that control one or a plurality of measurement equipment, respectively.

With this configuration, since the measurement device according to the present invention can control the measurement equipment used for the test (for example, a signal analyzer, a signal generator, a Global Navigation Satellite System (GNSS) simulators, and the like), it is possible to efficiently execute the test on the component that constitutes the Open RAN such as O-RAN.

A measurement method according to the present invention is a measurement method of testing a component included in a component group constituting an Open Radio Access Network (Open RAN), the measurement method including: a display step of displaying information related to a test in a display unit (12); a preparing step of preparing a device control unit group (14) that includes a plurality of device control units (141-147) controlling control target devices (201-207) of a control target device group (20), respectively, the control target device group (20) including the control target devices (201-207) that each simulate the component of the component group; a measurement target setting step (S1) of setting a component selected from the component group as a measurement target device; a test case creation step (S4) of creating a test case by displaying a use order of device control units to be used for the test of the measurement target device among the device control unit group on the display unit (12) in a user-settable manner; and a test case execution step (S7) of executing the test case as to the device control units to be used for the test in the set use order.

As described above, in the measurement method according to the present invention, the measurement target setting step sets, as the measurement target device, the component selected arbitrarily from the Open RAN component group that constitutes the Open RAN. Accordingly, it is possible to freely select the measurement target from the component group that constitutes the Open RAN and execute the test. Further, the control target device group prepared in the preparing step comprehensively includes, as the control target devices, at least a plurality of emulators that each simulate the component of the component group constituting the Open RAN, and the device control unit group comprehensively includes a plurality of device control units that each control the control target devices among the control target device group. The test case creation step displays the use order of the device control units to be used for the test of the measurement target device among the device control unit group on the display unit in a user-selectable manner to efficiently create the test case. With this process, it is possible to execute the test systematically and efficiently on the component that constitutes the Open RAN.

Effect of the Invention

The present invention can provide a measurement device and a measurement method can systematically and efficiently execute a test by freely selecting a component constituting an Open RAN such as O-RAN as a test target.

DETAILED DESCRIPTION OF EMBODIMENTS

Hereinafter, embodiments of a measurement device and a measurement method according to the present invention will be described in detail with reference to the drawings.

Device Configuration

Figure 1:
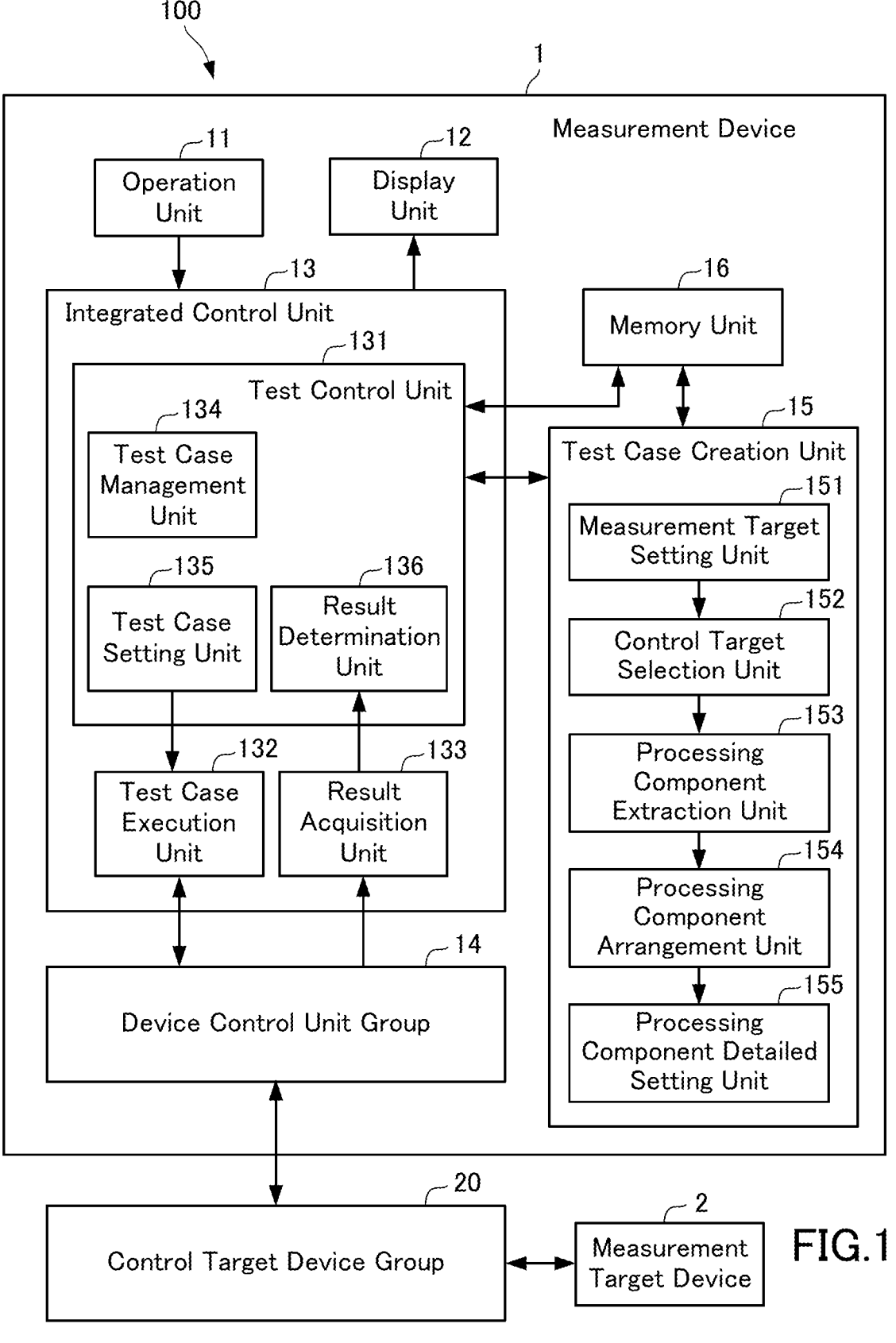
FIG. 1 is a block diagram illustrating the configuration of a measurement device according to an embodiment of the present invention.

FIG. 1 is a block diagram illustrating the configuration of a measurement device 1 according to an embodiment of the present invention. The measurement device 1 is a device that executes various tests such as interoperability tests with components of other vendors and operation tests in an O-RAN system, with respect to a measurement target device 2 that is a device selected arbitrarily from a component group that constitutes O-RAN. As illustrated in FIG. 1, the measurement device 1 includes an operation unit 11, a display unit 12, an integrated control unit 13, a device control unit group 14, a test case creation unit 15, and a memory unit 16. A measurement system 100 is composed of the measurement device 1 and a control target device group 20. Each component will be described below. It should be noted that O-RAN in the present invention is defined as an Open RAN in the broad sense and includes the ability to separate RAN into components and to use them in combination.

The operation unit 11 includes input devices such as a keyboard, a mouse, and a touch panel, and outputs, to an integrated control unit 13, instruction information that is input by the operation of a user to the measurement device 1, for example. For example, the user can operate the operation unit 11 to set or select the type of a test to be executed, the measurement target device, the control target device, and the like.

The display unit 12 includes an image display device such as a liquid crystal display, and displays information related to the test including a test case created by the test case creation unit 15, a result obtained by executing the test case, various statuses during the test, and the like. Further, the display unit 12 displays information on the pass/fail status of the test for the measurement target device 2, which is determined by a result determination unit 136 to be described later.

The integrated control unit 13 executes the test case and evaluates the execution result, for example. The integrated control unit 13 includes a test control unit 131, a test case execution unit 132, and a result acquisition unit 133.

When executing multiple test cases including a test case created by the test case creation unit 15 or a test case acquired from the memory unit 16, the test control unit 131 controls the execution of the test cases based on the list of their execution order (test case execution order list) and evaluates the execution results of the test cases. The evaluation is executed based on the preset evaluation criteria (determination criteria) for each test case.

The test control unit 131 includes a test case management unit 134 that manages the test case, a test case setting unit 135 that sets the test case to be executed, and a result determination unit 136 that determines the execution result of the test case.

The test case management unit 134 enables the user to add, delete, and edit the test case. The test case setting unit 135 stores (sets) a test case selected by the user or automatically selected in a RAM or the memory unit 16 as an execution test case.

The result determination unit 136 determines pass/fail status of the test from the measurement result (the execution result of the test case) acquired from the measurement target device 2 based on a predetermined criterion. For example, in the case of an interoperability test, the result determination unit 136 determines whether or not the measurement target device 2 is able to successfully communicate with an emulator of an adjacent component in compliance with the predetermined communication standards. This makes it possible to promptly obtain the result of the test for the measurement target device 2.

The test case execution unit 132 executes the test case by using the device control units to be used for the test in the use order set in the test case. Specifically, the test case execution unit 132 transmits instruction information such as transmission information and setting information to the device control unit group 14, based on the information on the test case and the test case execution order list set by the test case setting unit 135 under the control of the test control unit 131, and executes the test by having the control target device group 20 and the measurement target device 2 communicate with each other under the control of the device control unit group 14.

The result acquisition unit 133 acquires information obtained as a result of the communication between the control target device group 20 and the measurement target device 2 from the control target device group 20 under the control of the device control unit group 14. The acquired information on test case execution result is transmitted to the result determination unit 136.

The device control unit group 14 includes a plurality of device control units that control each of the control target devices included in the control target device group 20. The control target device group 20 includes, as the control target devices, a plurality of emulators that simulate each of the components of the component group that constitutes the RAN, and the measurement equipment to be used for the test.

Figure 2:
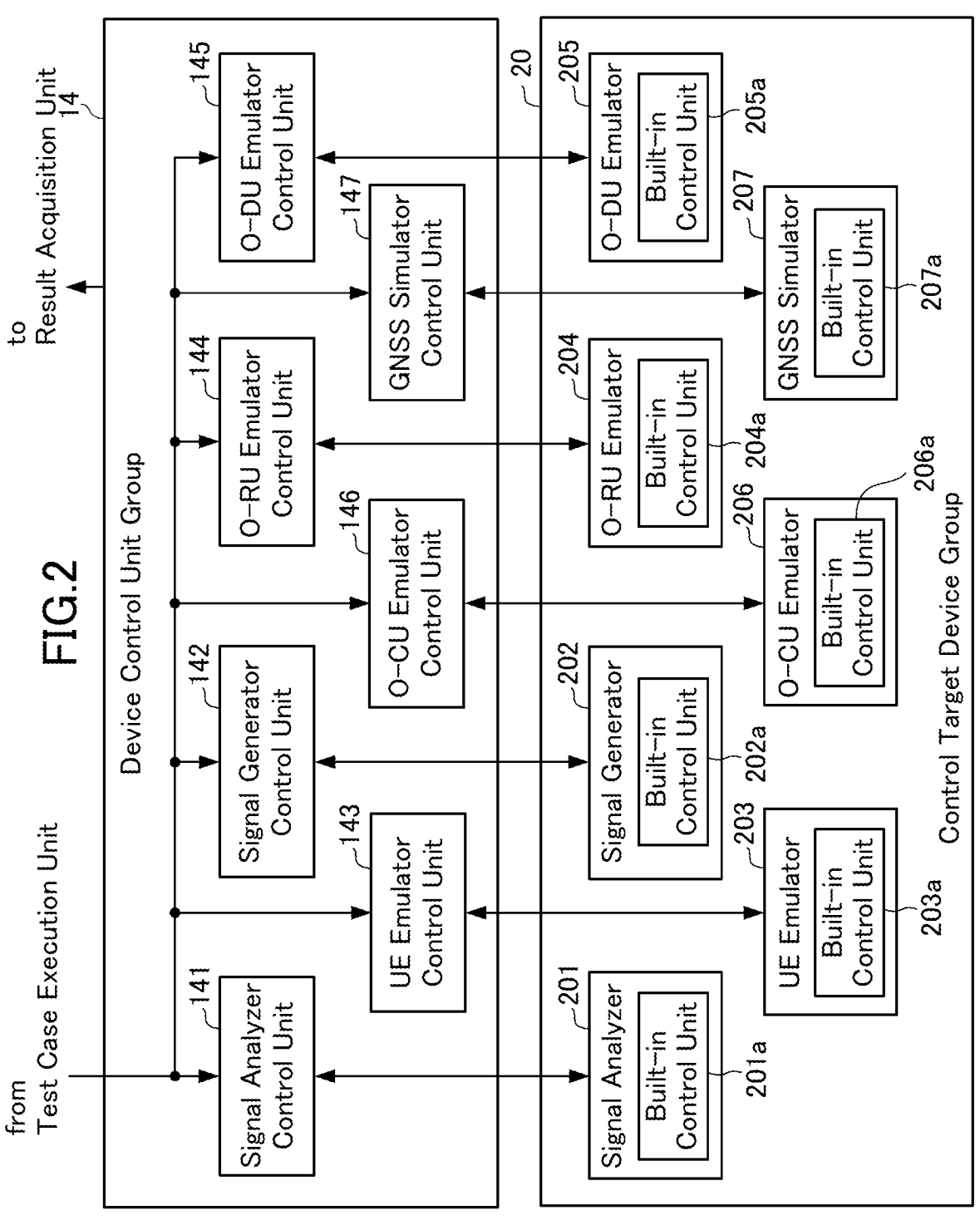
FIG. 2 is a diagram illustrating the configuration of a device control unit group and a control target device group in FIG. 1.

Specifically, as illustrated in FIG. 2, the device control unit group 14 includes a signal analyzer control unit 141, a signal generator control unit 142, a user equipment (UE) emulator control unit 143, an Open-RAN Radio Unit (O-RU) emulator control Unit 144, an Open-RAN Distributed Unit (O-DU) emulator control unit 145, an Open-RAN Central Unit (O-CU) emulator control unit 146, and Global Navigation Satellite System (GNSS) simulator control unit 147, as the device control units that control the control target devices. It should be noted that a device marked with "O-" means a device complying with the O-RAN specifications.

The control target device group 20 includes, for example, a signal analyzer 201, a signal generator 202, a UE emulator 203, an O-RU emulator 204, an O-DU emulator 205, an O-CU emulator 206, and a GNSS simulator 207, as the control target devices. The control target devices included in the control target device group 20 communicate with corresponding device control units on the side of the device control unit group 14 through wired or radio communication, respectively. Further, the control target devices include built-in control units 201*a*, 202*a*, 203*a*, 204*a*, 205*a*, 206*a*, 207*a* that are built in and control the control target devices themselves, respectively.

The signal analyzer 201 receives an instruction from the test case execution unit 132 via the signal analyzer control unit 141, performs signal analysis and transmits the analysis result to the result acquisition unit 133 under the control of the built-in control unit 201*a*. The signal generator 202 receives an instruction from the test case execution unit 132 via the signal generator control unit 142 and generates a signal under the control of the built-in control unit 202*a*. The UE emulator 203 receives an instruction from the test case execution unit 132 via the UE emulator control unit 143 and simulates a UE under the control of the built-in control unit 203*a*.

The O-RU emulator 204 receives an instruction from the test case execution unit 132 via the O-RU emulator control unit 144 and simulates an O-RU under the control of the built-in control unit 204*a*. The O-DU emulator 205 receives an instruction from the test case execution unit 132 via the O-DU emulator control unit 145 and simulates an O-DU under the control of the built-in control unit 205*a*. The O-CU emulator 206 receives an instruction from the test case execution unit 132 via the O-CU emulator control unit 146 and simulates an O-CU under the control of the built-in control unit 206*a*.

The GNSS simulator 207 receives an instruction from the test case execution unit 132 via the GNSS simulator control unit 147 and simulates a GNSS under the control of the built-in control unit 207*a*. The GNSS simulator 207 simulates a global positioning satellite system. GNSS transmits time (or time point) information as well as position information. The components that constitute O-RAN synchronize with each other using the time information included in the radio waves transmitted from the GNSS. The GNSS simulator 207 transmits the time information for synchronization through wired or radio communication, like GNSS.

The control target device group 20 in this embodiment includes the above seven control target devices, but the number and type are not limited to the above. The control target device group 20 may be configured to include any number and any type of control target devices, depending on the configuration of the O-RAN system or the test content.

The memory unit 16 is configured with a solid state drive (SSD), a hard disk drive (HDD), a flash memory, or the like. The memory unit 16 stores information on the test case created by the test case creation unit 15, information on the test case execution order list, information on the test result of each test case, and the like.

Figure 3:
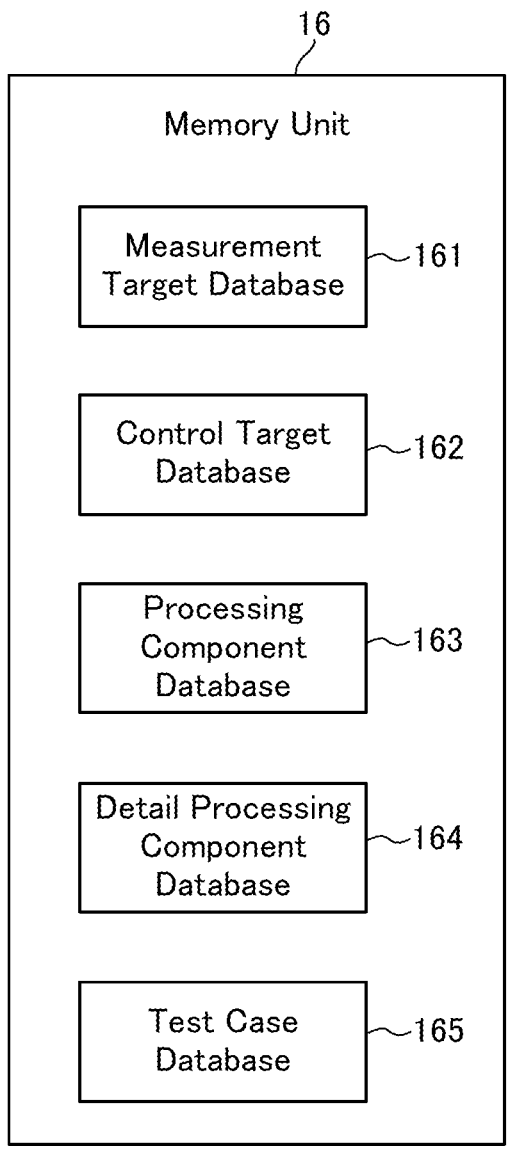
FIG. 3 is a diagram illustrating the configuration of a memory unit in FIG. 1.

FIG. 3 illustrates the configuration of the memory unit 16. As illustrated in FIG. 3, the memory unit 16 includes a measurement target database 161, a control target database 162, a processing component database 163, a detail processing component database 164, and a test case database 165.

The measurement target database 161 stores measurement targets selectable from among the components that constitute O-RAN, in association with the identification number of the component, for example. The control target database 162 stores controllable control target devices that can be used for the test, in association with the identification number of the component or in association with the measurement target device 2, for example.

The processing component database 163 stores "processing components", which are processes that can be executed for the control target device, in association with the control target device or its identification number. The detail processing component database 164 stores "detail processing components", which are detail processes that can be executed for the control target device, in association with the control target device or its identification number.

The test case database 165 stores information on the test case acquired by the test case creation unit 15 or other methods.

(Test Case Creation Unit)

Next, the test case creation unit 15 will be described.

The test case creation unit 15 creates the test case. Specifically, the test case creation unit 15 creates the test case by displaying the use order of the device control units to be used for the test of the measurement target device 2 among the device control unit group 14 on the display unit 12 in a user-settable manner. For this purpose, as illustrated in FIG. 1, the test case creation unit 15 includes a measurement target setting unit 151, a control target selection unit 152, a processing component extraction unit 153, a processing component arrangement unit 154, and a processing component detailed setting unit 155.

The measurement target setting unit 151 sets a component arbitrarily selected by the user among the component group that constitutes O-RAN as the measurement target device 2. Examples of the component group include UE, O-RU, O-DU, and O-CU. The information on the component group is stored in the measurement target database 161 in advance. Specifically, for example, the user selects or inputs a measurement target device from a pull-down menu in a measurement target setting area 31 of a display screen 30 on the display unit 12 by operating the operation unit 11. The measurement target setting unit 151 specifies the measurement target device 2 selected by the user under the control of the integrated control unit 13 and stores the identification information of the specified measurement target device 2 in the memory unit 16, whereby the measurement target is set. In this way, the measurement target can be freely selected among the component group that constitutes O-RAN, and then the test can be executed.

The control target selection unit 152 is configured to enable the user to select the component to be controlled in the test. Specifically, the control target selection unit 152 displays the identification information of the control target devices that can be used for the test of the measurement target device 2 among the control target device group 20 on the display unit 12 in a user-selectable manner. The control target device group 20 includes, for example, the signal analyzer 201, the signal generator 202, the UE emulator 203, the O-RU emulator 204, the O-DU emulator 205, the O-CU emulator 206, and the GNSS simulator 207. The information on the control target device group 20 is stored in the control target database 162 in advance.

More specifically, for example, the user operates the operation unit 11 to select a control target device by checking a check box in the control target selection area 32 of the display screen 30 displayed on the display unit 12. The control target selection unit 152 acquires the identification information of the control target device selected by the user under the control of the integrated control unit 13, and stores the acquired identification information in the memory unit 16. With this configuration, only the control target devices that can be used to test the measurement target device 2 among the control target device group 20 are displayed on the display unit 12 in a user-selectable manner, in accordance with the measurement target device 2 selected from the component group that constitutes O-RAN, thus enabling efficient selection of the control target device.

The control target selection unit 152 may be configured to select at least the emulator of the component adjacent to the measurement target device 2 in O-RAN as the control target device. For example, when an O-RU may be selected as the measurement target device 2, the control target selection unit 152 selects, as the control target device, at least one of the O-DU emulator 205 of the O-DU adjacent to the O-RU and the UE emulator 203 of the UE. With this configuration, there is no need for the user to select the emulator of the component adjacent to the measurement target device 2, and the control target device can be efficiently and accurately selected in accordance with the measurement target device 2 set by the measurement target setting unit 151.

The processing component extraction unit 153 extracts the identification information of the control process that can be executed for the control target device selected by the control target selection unit 152 from the processing component database 163 and displays the extracted identification information as a processing component on the display unit 12 in a user-selectable manner. Information on the processing component is stored in the processing component database 163. As described below, the processing component selected by the user is associated with the device control unit of which use order is specified in the test case.

Examples of the processing components or their identifiers include, for example, "Signal Analyzer Control", "Signal Generator Control", "UE Emulator Control", "O-DU Emulator Control", "O-CU Emulator Control", "GNSS Simulator Control", and the like.

The processing component arrangement unit 154 arranges and displays the processing components selected from the processing components extracted by the processing component extraction unit 153 side by side on the display unit 12 in a manner that the user can change an order of the displayed processing components, and stores the information of a series of the processing components arranged in the order as the test case in the memory unit 16 (for example, the test case database 165). Specifically, the user selects processing components to be used in the test case from the processing component group displayed in a processing component display area 33 of the display screen 30 by operating the mouse or other device of the operation unit 11, and arranges the processing components in the processing column of the test case creation area 34 by drag-and-drop operation, for example. In this way, the test case can be created by arranging the processing components in order. With this configuration, since the test case can be efficiently created by the user arranging the processing components in an arbitrary order, it is possible to efficiently execute the test for the component that constitutes O-RAN.

The processing component detailed setting unit 155 displays the processing content of the processing component, which is displayed in the test case creation area 34 on the display unit 12 by the processing component arrangement unit 154, on the display unit 12 in a user-settable manner. Specifically, for example, the user may select a processing component for which detailed settings are to be made, set the processing content and the parameter necessary for the processing component in a different window and the like by operating the mouse or other device of the operation unit 11, and store the information in memory unit 16. With this configuration, the test case can be created precisely since the user can make detailed settings for the processing content of the processing component with simple operation. As a result, the test can be accurately executed for the component that constitutes O-RAN.

(Display Screen)

Figure 4:
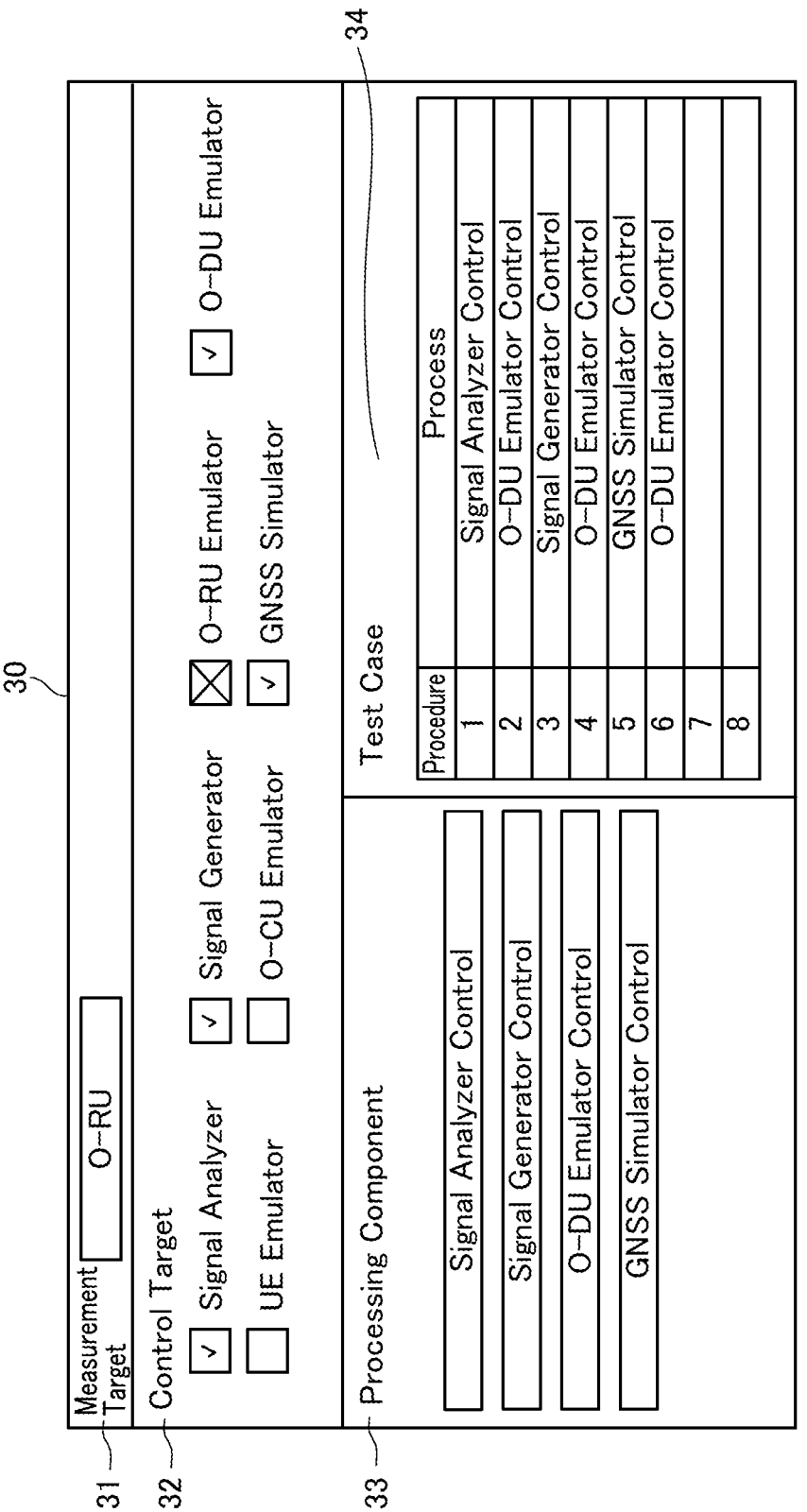
FIG. 4 is a diagram illustrating an example of the display screen of a display unit in FIG. 1.

FIG. 4 is a diagram illustrating an example of the display screen 30 displayed on the display unit 12 of the measurement device 1. As illustrated in FIG. 4, the display screen 30 includes, for example, a measurement target setting area 31, a control target selection area 32, a processing component display area 33, and a test case creation area 34.

The measurement target setting area 31 is an area where the user selects a measurement target from a pull-down menu, for example, by operating the operation unit 11. Examples of selectable measurement targets include UE, O-RU, O-DU, and O-CU.

The control target selection area 32 is an area where the user selects a control target device in the test, for example, by checking a check box. Examples of selectable control target devices include the signal analyzer 201, the signal generator 202, the UE emulator 203, the O-RU emulator 204, the O-DU emulator 205, the O-CU emulator 206, and the GNSS simulator 207.

The processing component display area 33 is an area for displaying "processing components", which are operations and processes that can be executed for the selected control target device.

The test case creation area 34 is an area for the user to create a test case by arranging the processing components, which are selected from the processing component group displayed in the processing component display area 33, in the processing column of the test case creation area 34 by drag-and-drop operation, for example.

Hardware Configuration

The measurement device 1 is configured by a computer device provided with a communication interface for communicating with the control target device group 20. This computer device has a central processing unit (CPU), a read only memory (ROM), a random access memory (RAM), an auxiliary storage device, and a communication interface.

Programs for functioning the computer device as the measurement device 1 are stored in the ROM and the auxiliary storage device of the computer device that configures the measurement device 1. In other words, the computer device functions as the measurement device 1 by the CPU executing the programs stored in the ROM and the like, using the RAM as its work area. Specifically, the various functions of the integrated control unit 13, the test case creation unit 15, and the device control unit group 14 can be implemented by executing the programs on the CPU of the computer device.

A part or whole of the measurement device 1 may be implemented by an integrated circuit such as, for example, an application specific integrated circuit (ASIC) or a field programmable gate array (FPGA). A part or whole of the measurement device 1 may be implemented by a combination of software and hardware circuitry.

(Interoperability Test)

Next, the operation of the measurement device 1 will be described using an interoperability test as an example.

The interoperability test is a test to confirm whether or not favorable communication can be achieved between adjacent components that constitute O-RAN.

Figure 5:
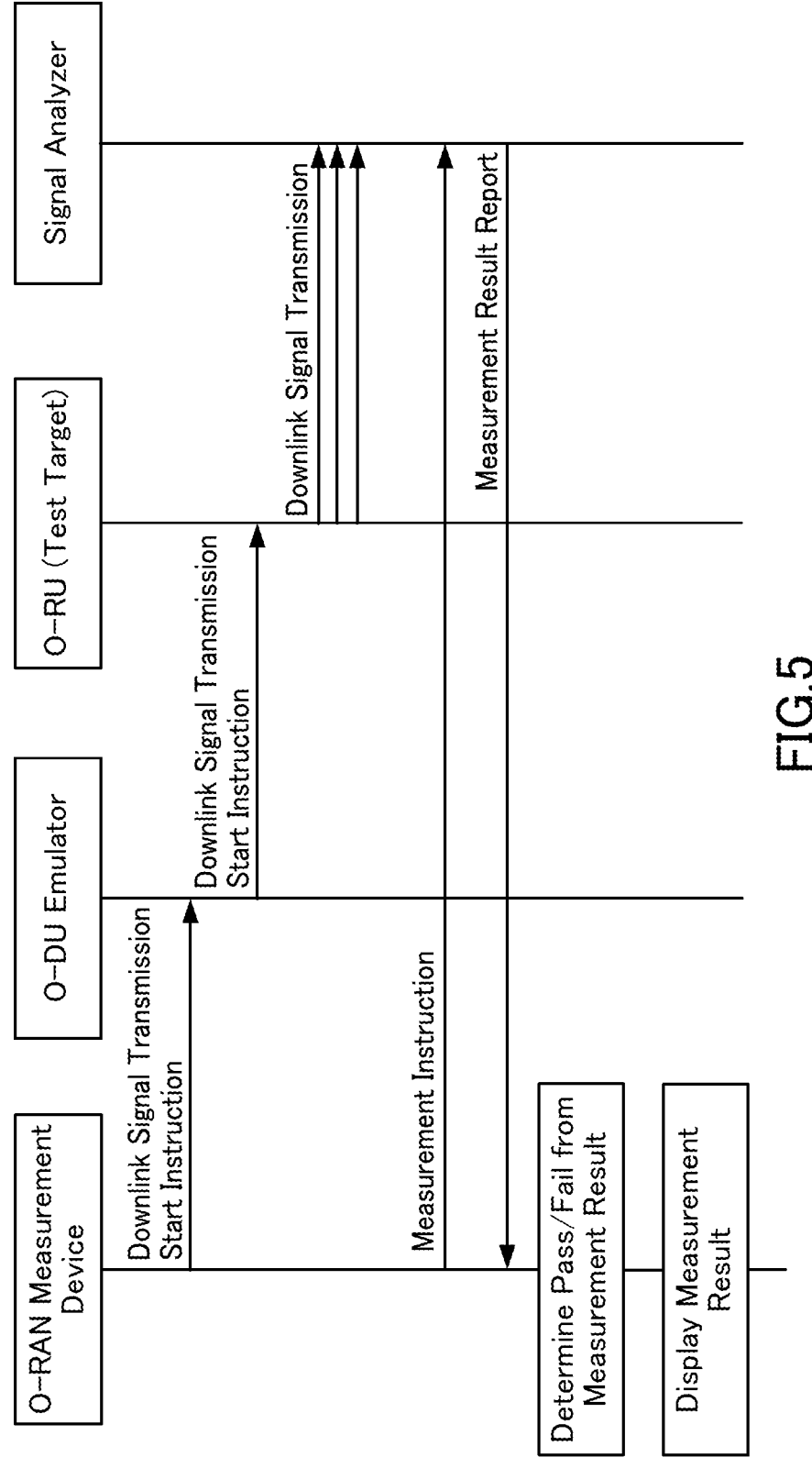
FIG. 5 is a flowchart illustrating an O-RU interoperability test (on downlink).

FIG. 5 illustrates the procedures of the interoperability test (on downlink) between the O-RU as the measurement target and the O-DU. As illustrated in FIG. 5, initially, the measurement device 1 transmits a downlink signal transmission instruction to the O-DU emulator 205. The O-DU emulator 205 transmits a downlink signal transmission instruction to the O-RU as the measurement target. At the same time, the measurement device 1 transmits a measurement instruction to the signal analyzer 201.

Receiving the downlink signal transmission start instruction, the O-RU transmits a downlink signal to the signal analyzer 201. Receiving the measurement instruction from the measurement device 1, the signal analyzer 201 analyzes the signal received from the O-RU and transmits the analysis result to the measurement device 1.

The measurement device 1 determines whether the connection is good or bad based on the predetermined criteria from the analysis result and displays the determination result on the display unit 12.

(Measurement Method)

Next, the measurement method will be described using a test for the O-RU as an example.

Figure 6:
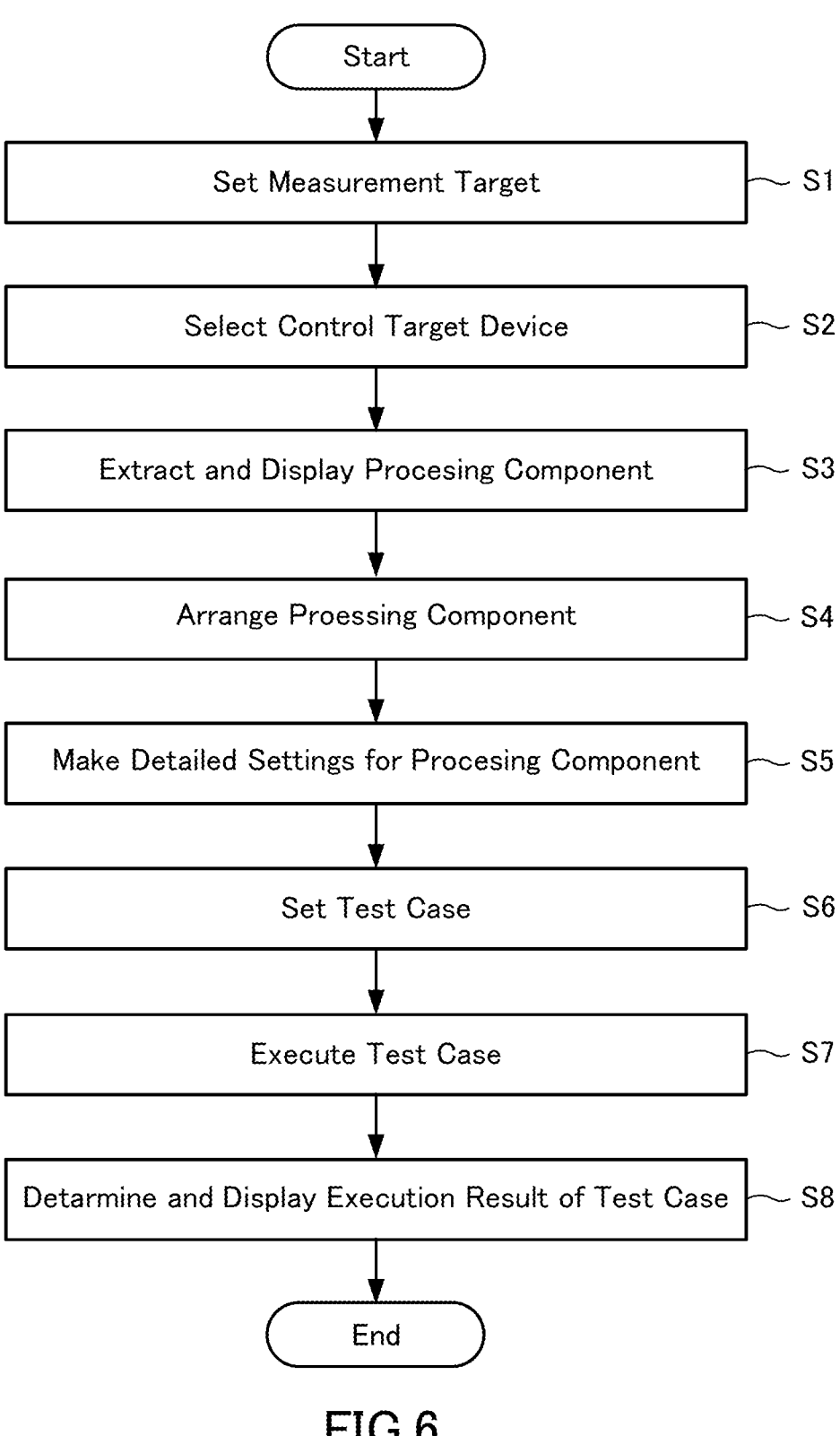
FIG. 6 is a flowchart illustrating the procedure of a measurement method according to the embodiment of the present invention.

FIG. 6 is a flowchart illustrating the measurement method according to the embodiment of the present invention. As illustrated in FIG. 6, initially, the user selects a component to be measured from the component group (UE, O-RU, O-DU, and O-CU, for example) that constitutes O-RAN. The measurement target setting unit 151 sets, as the measurement target device 2, the component selected by the user from the component group of O-RAN (step S1).

Specifically, for example, the user selects a measurement target from the pull-down menu in the measurement target setting area 31 of the display screen 30 displayed on the display unit 12 by operating the operation unit 11 or the user inputs the measurement target from the keyboard. The measurement target setting unit 151 acquires the identification information of the measurement target device 2 selected by the user under the control of the integrated control unit 13 and stores the acquired information in the memory unit 16. In FIG. 6, the O-RU is set as the measurement target in the measurement target setting area 31.

Next, the user selects a control target device from the control target device group 20 (step S2). Specifically, the user operates the operation unit 11 to check the check box in the control target selection area 32 of the display screen 30 displayed on the display unit 12. The control target selection unit 152 acquires information on the control target device selected by the user under the control of the integrated control unit 13 and stores the information in the memory unit 16. In FIG. 6, the signal analyzer 201, the signal generator 202, the O-DU emulator 205, and the GNSS simulator 207 are selected as the control target devices in the control target selection area 32. Since the measurement target is set to the O-RU, the O-RU emulator 204 is not allowed to be sselected as the control target device.

Next, the processing component extraction unit 153 extracts the operations and processes that can be executed for the control target device as "processing components" based on the information on the control target device selected by the user and displays them on the display unit 12 (step S3). Specifically, the processing component extraction unit 153 extracts the processing components corresponding to the control target device selected by the user from among the processing components included in the processing component database 163 of the memory unit 16 and displays the extracted processing components side by side in the processing component display area 33 of the display screen 30 displayed on the display unit 12. In the example of FIG. 6, "Signal Analyzer Control", "Signal Generator Control", "O-DU Emulator Control", and "GNSS Simulator Control"

are displayed as the processing components in the processing component display area 33.

Next, the user arranges, in the test case creation area 34, the processing components extracted by the processing component extraction unit 153 in order according to the procedures of the test case (step S4). Specifically, under the control of the processing component arrangement unit 154, the user selects the processing components to be used for the test case from the processing component group displayed in the processing component display area 33 of the display screen 30 by operating the mouse or other device of the operation unit 11 and arranges them in the processing column of the test case creation area 34, for example, by drag-and-drop operation. The processing components can be selected in duplicate. In the example of FIG. 6, "Signal Analyzer Control", "O-DU Emulator Control", "Signal Generator Control", "O-DU Emulator Control", "GNSS Simulator Control", and "O-DU Emulator Control" are arranged as the processing components in order from procedure 1 in the test case creation area 34.

Next, the user makes detailed settings for the processing contents of the processing components arranged in the test case creation area 34, if necessary (step S5). Specifically, when the user selects the processing component for which detailed settings are to be made by using the mouse or other device of the operation unit 11, the processing component detailed setting unit 155 acquires the "detail processing components" corresponding to the processing components to be set in detail from the detail processing component database 164. The detail processing component includes the detailed operations and processes as well as the necessary parameters, which can be executed for the control target device. Under the control of the processing component detailed setting unit 155, the user operates the operation unit 11 to select the desired detail processing component from the acquired detail processing components and to set the various parameters as necessary. The processing component detailed setting unit 155 acquires information on the detailed processing component and the set parameter selected by the user and stores them in the memory unit 16. In this way, the processing component detailed setting unit 155 makes detailed settings for all necessary processing components to create a test case and stores the information on the test case in the test case database 165 of the memory unit 16 or the like.

Next, the test case setting unit 135 acquires information on the test case to be executed from the memory unit 16 and stores (sets) the acquired information as an execution test case in the RAM or the memory unit 16 (step S6). Specifically, the test case setting unit 135 sets, as the execution test case, the information on the test case created by the test case creation unit 15. Alternatively, the test case setting unit 135 sets, as the execution test case, the test case selected from the test case database 165 by the user operating the operation unit 11.

Next, the test case execution unit 132 executes the set execution test case (step S7). Specifically, the test case execution unit 132 executes the processing contents indicated by the processing components composing the execution test case in order according to the procedures. In each procedure, the test case execution unit 132 executes the process by controlling the control target device group 20 through wired or radio communication using the device control unit corresponding to the processing component.

Next, the result acquisition unit 133 acquires the execution result of the test case, the result determination unit 136 determines whether the result are good or bad, displays the determination result on the display unit 12 and stores the determination result in the memory unit 16 (step S8). Specifically, the result acquisition unit 133 acquires, as an execution result, the information (data) that is transmitted as a result of the execution of the test case from the measurement target device 2 via the control target device group 20 under the control of the device control unit. The result determination unit 136 evaluates the execution result based on the predetermined criteria for the test case and the like, and determines whether the test for the measurement target device 2 passes or fails. The test control unit 131 displays the various conditions of the test as well as the pass/fail status of the test on the display unit 12 and stores them in the memory unit 16.

*Action Effect*

As described above, the measurement device 1 according to the embodiment is configured so that the measurement target setting unit 151 sets a component selected arbitrarily by the user from a component group that constitutes O-RAN as the measurement target device 2. Thereby, it is possible to freely select a measurement target from the component group that constitutes O-RAN and execute the test. The device control unit group 14 comprehensively includes the emulators (the UE emulator 203, the O-RU emulator 204, the O-DU emulator 205, the O-CU emulator 206), which each simulate the components of the component unit group that constitutes O-RAN and the measurement equipment (the signal analyzer 201, the signal generator 202, and the GNSS simulator 207) to be used for test. Then, the test case creation unit 15 displays the use order of the device control units to be used for the test of the measurement target device 2 among the device control unit group 14 on the display unit 12 in a user-settable manner, thereby allowing the test case to be executed efficiently. With this configuration, it is possible to systematically and efficiently execute the test for the component that constitutes O-RAN.

In the above embodiments, descriptions have been provided using an example of a component complying with the O-RAN specifications. However, the specifications are not limited to the O-RAN specifications, and the present invention can be applied to the test for the component constituting any network in which the communication interfaces between the equipment are standardized.

*INDUSTRIAL APPLICABILITY*

As described above, the present invention has an advantageous advantage that a component constituting the Open RAN such as O-RAN, can be freely selected as a test target and that the test can be executed systematically and efficiently. The present invention is useful for overall measurement devices and measurement methods for Open RAN components.

*EXPLANATION OF REFERENCE NUMERALS*

1 Measurement device
100 Measurement system
2 Measurement target device
11 Operation unit
12 Display unit
13 Integrated control unit
131 Test control unit
132 Test case execution unit
133 Result acquisition unit

14

134 Test case management unit
135 Test case setting unit
136 Result determination unit
14 Device control unit group
141 Signal analyzer control unit
142 Signal generator control unit
143 UE emulator control unit
144 O-RU emulator control unit
145 O-DU emulator control unit
146 O-CU emulator control unit
147 GNSS simulator control unit
15 Test case creation unit
151 Measurement target setting unit
152 Control target selection unit
153 Processing component extraction unit
154 Processing component arrangement unit
155 Processing component detailed setting unit
16 Memory unit
161 Measurement target database
162 Control target database
163 Processing component database
164 Detail processing component database
165 Test case database
20 Control target device group
201 Signal analyzer
202 Signal generator
203 UE emulator
204 O-RU emulator
205 O-DU emulator
206 O-CU emulator
207 GNSS simulator
30 Display screen
31 Measurement target setting area
32 Control target selection area
33 Processing component display area
34 Test case creation area

What is claimed is:

1. A measurement device for testing a component included in a component group constituting an Open Radio Access Network (Open RAN), the measurement device comprising:

a display unit, including a display screen, that displays information related to a test;

a device control unit group, including a CPU, an ASIC or an FPGA, that includes a plurality of device control units controlling control target devices of a control target device group, respectively, the control target device group including the control target devices that each simulate the component of the component group;

a measurement target setting unit, including a CPU, an ASIC or an FPGA, that sets a component selected from the component group as a measurement target device;

a test case creation unit, including a CPU, an ASIC or an FPGA, that creates a test case by displaying a use order of device control units to be used for the test of the measurement target device among the device control unit group on the display unit in a user-settable manner;

a test case execution unit, including a CPU, an ASIC or an FPGA, that executes the test case as to the device control units to be used for the test in the set use order; and a control target selection unit, including a CPU, an ASIC or an FPGA, that displays identification information of control target devices usable for the test of the measurement target device among the control target device group in a manner on the display unit in a user-selectable manner, wherein the control target selection unit selects, in accordance with the measurement target device set by the measurement target setting unit and without requiring user selection, an emulator of a component adjacent to at least the measurement target device in the Open RAN as the control target device.

2. The measurement device according to claim 1, further comprising a processing component extraction unit, including a CPU, an ASIC or an FPGA, that extracts, from a processing component database, identification information of a control processing executable for the control target device selected by the control target selection unit as a processing component, and displays the extracted processing component in a user-selectable manner, wherein the processing component selected by the user is associated with a device control unit in which the user order is specified in the test case.

3. The measurement device according to claim 2, further comprising a processing component arrangement unit, including a CPU, an ASIC or an FPGA, that displays processing components selected from the processing components extracted by the processing component extraction unit side by side on the display unit in align in a manner that the user can change an order of the displayed processing components, and stores, in a memory unit, information on a series of the processing components arranged in the order changed by the user as the test case.

4. The measurement device according to claim 3, further comprising a processing component detailed setting unit, including a CPU, an ASIC or an FPGA, that displays, on the display unit in a user-settable manner, a processing content of the processing component displayed on the display unit by the processing component arrangement unit.

5. The measurement device according to claim 1, the component device group includes a radio unit of the Open RAN (O-RU), a distributed unit of the Open RAN (O-DU), a central unit of the Open RAN (O-CU), and a user equipment (UE).

6. The measurement device according to claim 1, wherein the device control unit group includes a plurality of device control units, including a CPU, an ASIC or an FPGA, that control one or a plurality of measurement equipment, respectively.

7. A measurement method of testing a component included in a component group constituting an Open Radio Access Network (Open RAN), the measurement method comprising:

a display step of displaying information related to a test in a display unit;

a preparing step of preparing a device control unit group that includes a plurality of device control units controlling control target devices of a control target device group, respectively, the control target device group including the control target devices that each simulate the component of the component group, respectively;

a measurement target setting step of setting a component selected from the component group as a measurement target device;

a test case creation step of creating a test case by displaying a use order of device control units to be used for the test of the measurement target device among the device control unit group on the display unit in a user-settable manner; and a test case execution step of executing the test case as to the device control units to be used for the test in the set use order, the measurement method further comprising a control target selection step of displaying identification information of control target devices usable for the test of the measurement target device among the control target device group in a manner on the display unit in a user-selectable manner, wherein, in the control target selection step, an emulator of a component adjacent to at least the measurement target device in the Open RAN is selected as the control target device, in accordance with the measurement target device set by the measurement target setting unit and without requiring user selection.

* * * * *